(12) United States Patent
Inoue

(10) Patent No.: US 9,602,701 B2
(45) Date of Patent: Mar. 21, 2017

(54) IMAGE-PICKUP APPARATUS FOR FORMING A PLURALITY OF OPTICAL IMAGES OF AN OBJECT, CONTROL METHOD THEREOF, AND NON-TRANSITORY COMPUTER-READABLE MEDIUM THEREFOR

(71) Applicant: CANON KABUSHIKI KAISHA, Tokyo (JP)

(72) Inventor: Chiaki Inoue, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 17 days.

(21) Appl. No.: 14/547,554

(22) Filed: Nov. 19, 2014

(65) Prior Publication Data

US 2015/0163397 A1    Jun. 11, 2015

(30) Foreign Application Priority Data

Dec. 10, 2013    (JP) .................................. 2013-254885

(51) Int. Cl.
| | | |
|---|---|---|
| H04N 5/225 | (2006.01) | |
| H04N 5/222 | (2006.01) | |
| H04N 5/232 | (2006.01) | |
| H04N 5/235 | (2006.01) | |
| H04N 13/02 | (2006.01) | |
| H04N 13/00 | (2006.01) | |

(52) U.S. Cl.
CPC ......... *H04N 5/2226* (2013.01); *H04N 5/2258* (2013.01); *H04N 5/2355* (2013.01); *H04N 5/23232* (2013.01); *H04N 5/23296* (2013.01); *H04N 13/0232* (2013.01); *H04N 2013/0081* (2013.01)

(58) Field of Classification Search
CPC ............. H04N 5/2258; H04N 13/0232; H04N 5/2355; H04N 5/23232
See application file for complete search history.

(56) References Cited

U.S. PATENT DOCUMENTS 8,593,564 B2 * 11/2013  Border ............... H04N 5/23212
                                                            348/340
2010/0103175 A1    4/2010  Okutomi et al.

FOREIGN PATENT DOCUMENTS

| JP | 2005303694 A |   | 10/2005 |
|---|---|---|---|
| JP | 2010050677 A | * | 3/2010 |
| WO | 2008050904 A1 |   | 5/2008 |

OTHER PUBLICATIONS

Ren Ng, "Fourier Slice Photography," ACM Transactions on Graphics, 2005, 24, pp. 735-744.

* cited by examiner

*Primary Examiner* — Gary C Vieaux
(74) *Attorney, Agent, or Firm* — Rossi, Kimms & McDowell LLP

(57) ABSTRACT

An image-pickup apparatus includes a plurality of imaging optical systems, a memory configured to store a relationship among an output pixel number, a frame rate, and a function that is available with at least one of the imaging optical system, and a controller configured to set, when first setting data is input as setting data of a first item among a plurality of items including the output pixel number, the frame rate, and the function, setting data of remaining items except the first item in the plurality of items based on any combinations of the plurality of items in which the first item has the first setting data in the relationship stored in the memory.

19 Claims, 5 Drawing Sheets

IMAGE-PICKUP APPARATUS FOR FORMING A PLURALITY OF OPTICAL IMAGES OF AN OBJECT, CONTROL METHOD THEREOF, AND NON-TRANSITORY COMPUTER-READABLE MEDIUM THEREFOR

BACKGROUND OF THE INVENTION

Field of the Invention

The present invention relates to a compound-eye image-pickup apparatus.

Description of the Related Art

Japanese Patent Laid-Open No. ("JP") 2005-303694 proposes a compound-eye image-pickup apparatus configured to capture an image so that short and long focus lenses having different angles of view contain the same portion of the object. International Publication WO008/050904 discloses an image-pickup apparatus configured to obtain a two-dimensional light intensity distribution of an object space and ray angular information or parallactic information using a camera array having the same angle of view. The two-dimensional light intensity distribution and the ray angular information are collectively referred to as a light field, which can provide three-dimensional information of the object space.

JP 2010-50677 discloses an image-pickup apparatus that includes an image sensor configured to provide pixel additions and thinning reading. The image-pickup apparatus is configured to reduce a burden of arduous setting of an image-pickup condition by automatically determining, when one of the output pixel number, the image-pickup sensitivity, and the frame rate is set, the remaining two items.

Ren Ng, "Fourier Slice Photography," ACM Trans. Graph. 24, 2005, pp. 735-744 discusses refocusing.

Nevertheless, no compound-eye image-pickup apparatus has been proposed, which can automatically and appropriately set a combination of an output pixel number, a frame rate, and an available function with at least one of a plurality of imaging optical systems, so as to improve the operability. A user usually has no idea of which of the plurality of imaging optical systems provides which of the above functions. JP 2010-50677 does not consider the efficiency of the setting method in this compound-eye structure.

SUMMARY OF THE INVENTION

The present invention provides an image-pickup apparatus, a control method, and a non-transitory computer-readable medium, which can automatically and appropriately set a combination of an available function with at least one of a plurality of imaging optical systems, an output pixel number, and a frame rate.

An image-pickup apparatus according to the present invention includes a plurality of imaging optical systems each configured to form an optical image of an object, an image sensor having image-pickup areas each corresponding to one of the plurality of imaging optical systems and each configured to photoelectrically convert the optical image formed by a corresponding one of the imaging optical systems, a memory configured to store a relationship among an output pixel number, a frame rate, and a function that is available with at least one of the imaging optical system, and a controller configured to set, when first setting data is input as setting data of a first item among a plurality of items including the output pixel number, the frame rate, and the function, setting data of remaining items except the first item in the plurality of items based on any combinations of the plurality of items in which the first item has the first setting data in the relationship stored in the memory.

Further features of the present invention will become apparent from the following description of exemplary embodiments with reference to the attached drawings.

DESCRIPTION OF THE EMBODIMENTS

A description will now be given of embodiments of the present invention with reference to the accompanying drawings.

First Embodiment

Figure 1:
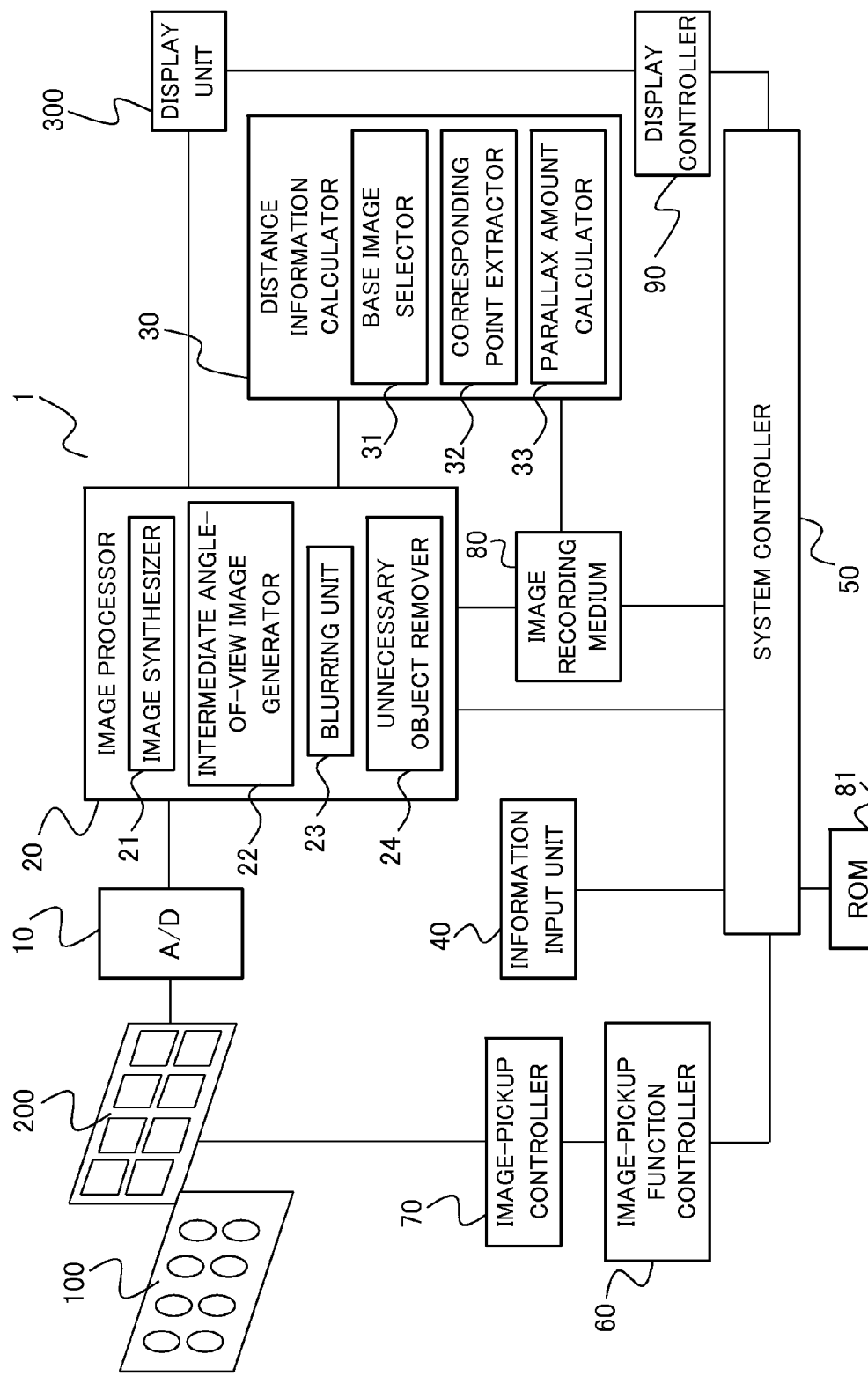
FIG. 1 is a block diagram of a compound-eye image-pickup apparatus according to a first embodiment of the present invention.

FIG. 1 is a block diagram of a compound-eye image-pickup apparatus 1 according to a first embodiment. The compound-eye image-pickup apparatus 1 includes an imaging optical unit 100, an image-pickup unit 200, an A/D converter 10, an image processor 20, a distance information calculator 30, an information input unit 40, a system controller 50, an image-pickup function controller 60, an image-pickup controller 70, an image recording medium 80, a display controller 90, and a display unit 300.

The compound-eye image-pickup apparatus 1 may be a lens integrated type image-pickup apparatus or may include a lens apparatus having an imaging optical system (image-pickup optical system), and an image-pickup apparatus body having an image sensor, to which a lens apparatus is attachable. This embodiment will discuss the lens integrated type image-pickup apparatus.

Figure 2:
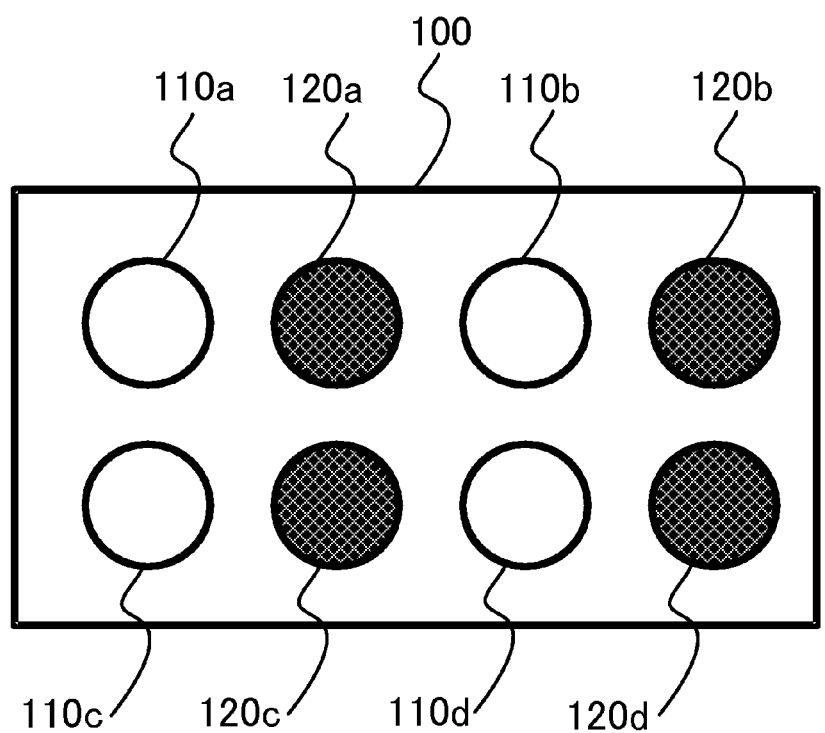
FIG. 2 is a plane view of an imaging optical unit of in the compound-eye image-pickup apparatus illustrated in FIG. 1.

FIG. 2 is a front view of the imaging optical unit 100. Imaging optical systems 110a, 110b, 110c, 110d, 120a, 120b, 120c, and 120d are imaging optical systems that constitute the compound eyes. Each of the imaging optical systems 110a, 110b, 110c, and 110d constitutes a first imaging optical system unit, and each of the imaging optical systems 120a, 120b, 120c, and 120d constitutes a second imaging optical system unit. The imaging optical system forms an optical image of an object.

As illustrated in FIGS. 1 and 2, the imaging optical unit 100 includes eight imaging optical systems (image-pickup optical systems), and the image sensor unit 200 includes and a plurality of image sensors each of which corresponds to one of the plurality of imaging optical systems. The image sensor photoelectrically converts an optical image that has reached the image plane into an electric signal via a corresponding one of the imaging optical systems 110a, 110b, 110c, 110d, 120a, 120b, 120c, and 120d.

The number of image sensors is not necessarily plural, and a single image sensor may be enough as long as it can obtain the image formed by each imaging optical system.

The eight imaging optical systems are arranged so that their optical axes can be parallel to each other. A plurality of images obtained by the image sensor unit 200 are parallax images observed at different viewpoints in the object space. The light field of the object space can be obtained by combining these images with one another. The light field and the image reconstruction processing can provide a focusing control of a captured image (referred to as refocusing), a viewpoint change, and a control of a depth of field, etc. A plurality of imaging optical systems have different angle of views (focal lengths).

The imaging optical systems 110a, 110b, 110c, and 110d constitute the first (telephoto) imaging optical system unit having a narrow angle of view or the narrowest image-pickup angle ($\theta$) of view among the imaging optical systems. The imaging optical systems 120a, 120b, 120c, and 120d constitute the second imaging optical system unit having an image-pickup angle ($2\theta$) of view.

Figure 3:
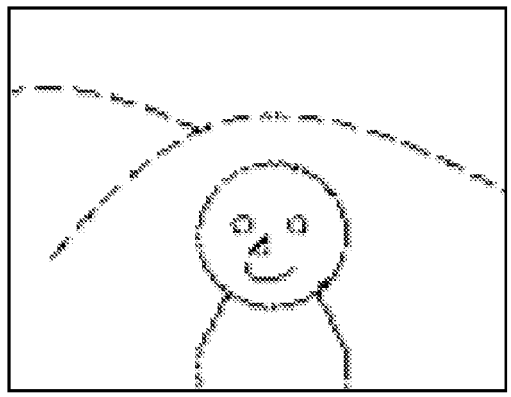
FIG. 3 illustrates exemplary images captured by each imaging optical system illustrated in FIG. 2.
Figure 3:
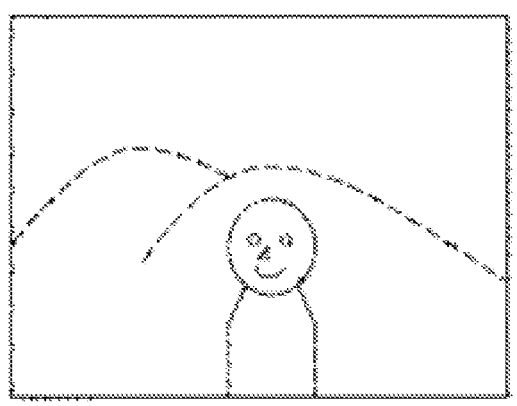

FIG. 3 illustrates a captured image 110 (a synthesized image) captured by the first imaging optical system unit, and a captured image 120 (a synthesized image) captured by the second imaging optical system unit. As illustrated in FIG. 3, the captured image 110 corresponds to capturing of an object space with a narrow angle of view, and the captured image 120 corresponds to capturing of an object space with a wide angle of view.

Next follows refocusing processing described in Ren Ng, "Fourier Slice Photography," supra. An illustrative parallax image acquirer may be a lens array structure arranged on the image side of the main imaging optical system or an arrangement of a plurality of imaging optical systems illustrated in FIG. 2. The following description will use the structure illustrated in FIG. 2 in an example.

Since four imaging optical systems having the same angles of view are arranged two-dimensionally in FIG. 2, images are obtained at four viewpoints having the same angles of view. An image corresponding to a certain imaging optical system will be referred to as a single viewpoint image. Four single viewpoint images have parallaxes with one another and a relative positional relationship of the object on the image changes according to the object distance.

When the single viewpoint images are synthesized so that the predetermined objects are aligned with one other, objects with different object distances are out of alignment when synthesized. These shifts blur the objects with different object distance. This blur depends upon the synthesized pupil of the imaging optical systems used for the synthesis. When all four images are synthesized, the blur of the image captured at the synthesized aperture formed by each imaging optical system can be reproduced. Since an arbitrary object may be aligned in the single viewpoint image, a captured image in which an arbitrary object is focused can be reproduced (refocusing function).

A description will now be given of means for realizing continuous zooming function in the compound-eye image-pickup apparatus having a plurality of optical systems having different angles of view. Digital zooming is known as a technique of trimming part of an image captured by the image-pickup apparatus and of enlarging the trimmed range to a predetermined size so as to obtain the same effect as pseudo zooming.

One conventional zoom lens is configured to combine the digital zooming with the optical zooming for a higher magnification variation. For example, the same effect as the pseud zooming can be obtained by applying this approach, by including the imaging optical systems having different angles in the compound-eye image-pickup apparatus, and by providing an interpolation using the digital zooming technology between different angles.

A more sophisticated method is image synthesizing processing that inserts a telephoto image obtained by the image sensor corresponding to the telephoto lens into part of the image obtained through the digital zooming so as to provide an image having an intermediate angle of view and a high resolution at that part and a low resolution at the remaining part. This method will be referred to as "different angle-of-view image synthesizing processing" hereinafter. This method can provide an image having a desired angle of view after a plurality of images having different angles of view are captured.

Turning back to FIG. 1, the A/D converter 10 converts analogue signals output from the image sensors into digital signals and supplies them to the image processor 20.

The image processor 20 performs predetermined pixel interpolation processing, color conversion processing, digital zooming etc. for each image data from the A/D converter 10, and executes predetermined calculation processing using each captured image data. The result processed by the image processor 20 is sent to the system controller 50.

The image processor 20 includes an image synthesizer 21, an intermediate angle-of-view image generator 22, a blurring unit 23, and an unnecessary object remover 24.

The image synthesizer 21 uses an image from the imaging optical system at a base viewpoint for a base image, and synthesizes images from the imaging optical systems having the same angles of view or different angles of view. The synthesizing method can use the conventional block matching method. The image synthesizer 21 can generate an image having an arbitrary angle of view that is virtually captured at the base viewpoint.

The image synthesizer 21 synthesizes a plurality of images, and provides processing, such as reducing a noise level and producing a high dynamic range ("HDR") image. The HDR function is realized by synthesizing two images having different exposure conditions of the two optical systems having the same angles of view, etc. The number of optical systems is not limited to two and three or more optical systems may be used.

The intermediate angle-of-view image generator 22 generates an intermediate angle-of-view image to interpolate an angle of view between the imaging optical systems having a different focal length. The generating method of an intermediate angle-of-view image may be ultra-resolution processing configured to improve the image resolution using a plurality of images. The ultra-resolution technology method can use a maximum-likelihood ("ML") method, a maximum a posterior ("MAP") method, a projection onto convex set ("POCS") method, an interactive back projection ("IBP") method, a lucy-richardson ("LR") method, etc.

This embodiment uses an image synthesizing processing method of inserting a telephoto image obtained from an image sensor corresponding to the telephoto lens into part of the image obtained from digital zooming and of obtaining an intermediate angle-of-view image in which one part has a high resolution and the other part has a low resolution. As discussed, this method is the different angle-of-view image synthesizing processing (zooming function).

The blurring unit 23 blurs an image on the basis of distance information obtained by the distance information calculator 30, which will be described later, (blurring function).

The unnecessary object remover 24 obtains an image, for example, by removing an unnecessary background other than the principal object which is designated by a photographer on the basis of the distance information (unnecessary object removing function).

The distance information calculator 30 includes a base image selector 31, a corresponding point extractor 32, and a parallactic amount calculator 33.

The base image selector 31 selects a base image for information acquisition from a plurality of parallax images formed by respective imaging optical systems. The corresponding point extractor 32 extracts a corresponding pixel in the parallax image. The parallactic amount calculator 33 calculates a parallactic amount of all extracted corresponding points. The distance information calculator 30 obtains object distance information in the image based upon the calculated parallactic amount.

The information input unit 40 includes a setting button that enables a user to input setting data (or a "setting value") of the output pixel number, the frame rate, and an available function with at least one of the plurality of imaging optical systems. An available function with at least one of the plurality of imaging optical systems may be referred to as a "compound-eye function" hereinafter, but this function is a board concept that covers a single-eye function in this embodiment. More specifically, the "compound-eye function" includes a refocusing function, a zooming function, an NR function, an HDR function, a blurring function, an unnecessary object removing function, and another function that can be realized by using at least one of a plurality of imaging optical systems.

A user can select and input another desired image-pickup condition, such as an F-number and an exposure time period. The user may use a release button that enables him to designate an image-pickup operation. The input information is supplied to the system controller 50.

The image-pickup function controller 60 determines setting data of the output pixel number, the frame rate, and the compound-eye function based on the information from the system controller 50, and sends the setting data to the image-pickup controller 70.

The image-pickup controller 70 moves a focus lens (not illustrated) in each imaging optical system and controls an F-number and an exposure time period of each imaging optical system based on information from the system controller 50 and image-pickup function controller 60. The image-pickup controller 70 selects an image sensor used for image-pickup and obtains a necessary image by setting and controlling the output pixel number and the frame rate.

The image recording medium 80 stores a plurality of still and motion images, and a file header of an image file. The image recording medium 80 can be a non-transitory computer-readable medium.

The ROM 81 is a memory configured to store a variety of programs executable by the system controller 50, and necessary data and tables. The table represents a relationship among the output pixel number, the frame rate, and the (compound-eye) function. The (compound-eye) function is an available function with at least one of the plurality of imaging optical systems.

Assume that an input is made to change to first setting data current setting data of one item (first item) among a plurality of (three herein) items which contains the output pixel number, the frame rate, and the function. In this case, the image-pickup function controller 60 serves as a controller configured to automatically set setting data of two remaining items except the first item among the three items based on any available combination(s) of the three items in which the first item has the first setting data in the table. The system controller 50 may have this function. Thereby, the operability improves.

The display controller 90 controls the display unit 300 based on information from the system controller 50 so that the display unit 300 displays a setting value and a notice of the image-pickup condition, and warning information. The display unit 300 displays a preview image at the image-pickup time, a captured image, a menu function, a focal length range, an angle-of-view range, and an image-pickup condition, etc., and includes a liquid crystal display device.

According to the compound-eye image-pickup apparatus 1, a condition relating to a data amount of a signal read out per a unit time contains a setting condition of the compound-eye function in addition to the setting conditions of the output pixel number and the frame rate in the image-pickup apparatus. In other words, the output pixel number of each image sensor and the frame rate can be set in accordance with the compound-eye function. By utilizing this configuration, the compound-eye image-pickup apparatus according to this embodiment automatically set, once the user sets one of the image-pickup conditions, such as the compound-eye function, the output pixel number, and of the frame rate, the two remaining image-pickup conditions to proper setting data. The image-pickup condition, such as the compound-eye function, the output pixel number, and the frame rate, will be particularly referred to as an "image-pickup function condition" hereinafter.

This embodiment specifically stores, in the ROM 81, a table of any combination information of the image-pickup function conditions including the frame rate, the output pixel number, and the compound-eye function. Herein, the table configured to store the combination information will be described.

Table 1 indicates the compound-eye function according to this embodiment.

TABLE 1

| compound-eye function | | | |
| --- | --- | --- | --- |
| function 1 (8 eyes) | function 2 (4 eyes) | function 3 (2 eyes) | function 4 (1 eye) |
| NR function | NR function | NR function | |
| HDR function | HDR function | HDR function | |
| blurring function | blurring function | blurring function | |
| unnecessary object removing function | unnecessary object removing function | unnecessary object removing function | |
| refocusing function | refocusing function | | |
| zooming function | | | |

The compound-eye function includes a refocusing function, a zooming function, an NR function, an HDR function, a blurring function, and an unnecessary object removing function. Each compound-eye function requires a minimum necessary number of imaging optical systems (or the number of eyes). For example, a combination of the NR function, the HDR function, and the unnecessary object removing function requires at least two imaging optical systems (or eyes) having the same angles of view. The blurring function also requires at least two eyes because the distance information is obtained. The refocusing function needs four imaging optical systems (or eyes) because parallax images in the upper, lower, left, and right directions are necessary having the same angles of view. The zooming function that maintains the above function needs at least one imaging optical system having a different angle of view in addition to the imaging optical systems having the same angles of view, and thus requires at least five eyes. This embodiment needs eight eyes for the zooming function so as to realize the function except the zooming function even with the telephoto angle of view.

In order to simply set the compound-eye function, the compound-eye function that can be realized with the eye(s) used for the image-pickup is categorized as in Table 1. The function 1 has all of the NR function, the HDR function, the blurring function, the unnecessary object removing function, the refocusing function, and the zooming function.

When the function 1 is set, all of the eight eyes can be used for the image-pickup.

Since the function 2 has the NR function, the HDR function, the blurring function, the unnecessary object removing function, and the refocusing function. When the function 2 is set, four eyes having the same angles of view are used for the image-pickup and the remaining four eyes having different angles of view are not used for the image-pickup.

The function 3 has the NR function, the HDR function, the blurring function, and the unnecessary object removing function. When the function 3 is set, two eyes having the same angles of view are used for the image-pickup and the two remaining eyes having different angles of view are not used for the image-pickup.

The function 4 does not realize the compound-eye function but is provided by only one imaging optical system for the image-pickup similarly to the normal image-pickup apparatus.

Since the function is categorized according to the number of eyes used for the image-pickup, the user can easily recognize the available function in setting the compound-eye function and the display of the available function becomes also easy. While this embodiment classifies the function as illustrated in Table 1, the number of eyes and the available function may be further categorized when the number of eyes and the number of different angles of view increase.

However, the zooming function is likely to be the function that requires the most eyes, and thus the zooming function (or angle-of-view changing function) may be preferentially restricted when the compound-eye function is to be limited. In this embodiment, as illustrated in Table 1, the function contains six items (sub-functions) of the function 1 (first functional items) and five items (second functional items) that can be realized by the imaging optical systems (four eyes) fewer than that for the function 1. In this illustration, the function 1 contains a change of an angle of view (zooming), but the function 2 does not contain that item.

The table will be now described. In the following description, the total pixel number of the image sensor in each imaging optical system is 800 million (8M) pixels. In other words, the total pixel number of the compound-eye image-pickup optical system having eight imaging optical systems is eight times or 64M pixels. Hereinafter, assume that the output pixel number is the pixel number output from each image sensor and the output pixel number at the image-pickup time is common to each image sensor for simplicity purposes.

In the actual apparatus, the output pixel number may be differently set for each image sensor, and that configuration may be reflected to the total image number of the compound-eye image-pickup apparatus in producing the table. In addition, assume that the compound-eye image-pickup apparatus according to this embodiment can process a readout signal corresponding to 192M pixels. In reading out the total pixel 64M of the compound-eye image-pickup apparatus, the highest value of the frame rate is characteristically 3 frames/seconds (fps).

Table 2 is a compound-eye function priority table configured to store combination information of the image-pickup conditions. A circle means the combination is available, and an X means a combination is unavailable.

TABLE 2

| | Compound-eye function | | | | | | | | | | | |
|---|---|---|---|---|---|---|---|---|---|---|---|---|
| | function 1 (8 eyes) | | | function 2 (4 eyes) | | | function 3 (2 eyes) | | | function 4 (1 eye) | | |
| | Output pixel number | | | | | | | | | | | |
| Frame rate | 8M | 4M | 2M | 8M | 4M | 2M | 8M | 4M | 2M | 8M | 4M | 2M |
| 3 fps | o | o | o | o | o | o | o | o | o | o | o | o |
| 6 fps | x | o | o | o | o | o | o | o | o | o | o | o |
| 12 fps | x | x | o | x | o | o | o | o | o | o | o | o |
| 24 fps | x | x | x | x | x | o | x | o | o | o | o | o |
| 48 fps | x | x | x | x | x | x | x | x | o | x | o | o |
| 96 fps | x | x | x | x | x | x | x | x | x | x | x | o |

When the function 1 is selected for the compound-eye function and the output pixel number is 8M, eight eyes are used so that each has an output pixel number of 8M. Thus, the total pixel number of the compound-eye image-pickup apparatus 1 becomes 64M, and the combinable frame rate is 3 fps only. The table stores combination information of three image-pickup function conditions.

In the compound-eye function priority table illustrated in Table 2, a circle indicating combinability is put in a cross part of the function 1 of the compound-eye function, the output pixel number of 8M, and the frame rate of 3 fps. When each image sensor can provide thinning reading or pixel addition reading, a half and quarter of output pixel number (4M) and (2M) can be set, for example. When the compound-eye function is function 1 and the output pixel number is 4M, 3 fps and 6 fpx can be set to the frame rate and a circle is put in the corresponding elements in the table. Similarly, when the compound-eye function is function 1 and the output pixel number is 2M, 3 fps, 6 fpx, and 12 fps can be set to the frame rate can be set and a circle is put in the corresponding element in the table.

When the function 2 is selected for the compound-eye function, the number of eyes necessary for the image-pickup becomes half (four eyes). Therefore, the total pixel number of the image-pickup apparatus 1 becomes half of the function 1. When the output pixel number is 8M, 3 fps and its double (6 fps) can be set to the frame rate. In addition, a double frame rate can be set to each of the 4M output and 2M output. The frame rate up to 12 fps can be set to the 4M output, and the frame rate up to 24 fps can be set to the 2M output.

The combination information of the image-pickup function condition, such as the compound-eye function, the output pixel number, and the frame rate, is stored for each of the functions 3 and 4 in the compound-eye function priority table illustrated in Table 2.

Figure 4:
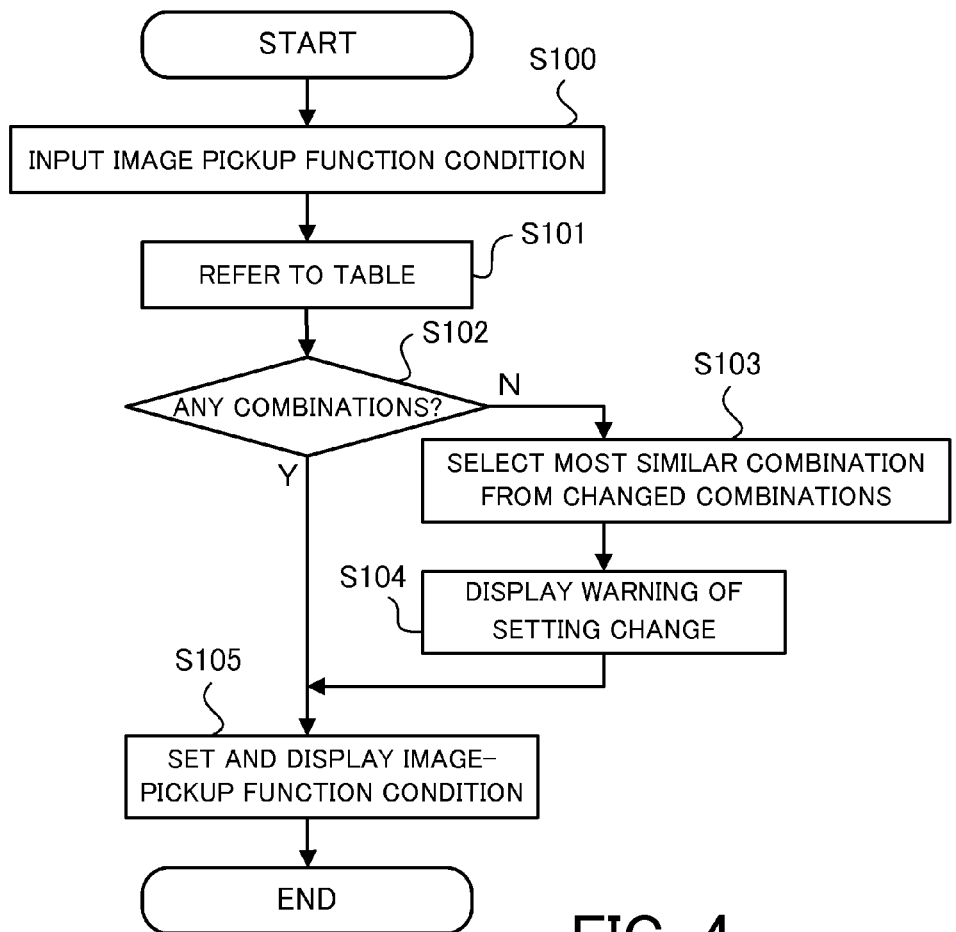
FIG. 4 is a flowchart for explaining an image-pickup (function) condition setting method according to the first embodiment.

A description will now be given of a flow of automatically determining setting data of an image-pickup function condition based on a compound-eye function priority table. FIG. 4 is a flowchart for explaining a method for setting an image-pickup function condition in the compound-eye image-pickup apparatus 1, and "S" stands for the step. The image processor 20, the distance information calculator 30, the system controller 50, the image-pickup function controller 60, and the image-pickup controller 70 can be configured as a microcomputer, and the method illustrated in FIG. 4 can be implemented as a program that enables a computer to execute each procedure. The program may be stored in a non-transitory computer-readable medium.

Initially, when setting data for changing one of three image-pickup function conditions is input by the user through the information input unit 40, the image-pickup function controller 60 obtains the two pieces of remaining current setting data of the image-pickup function conditions (S100).

Next, the image-pickup function controller 60 refers to the compound-eye function priority table, and checks for any combinations of the setting data in the three image-pickup function conditions (S101).

Next, the image-pickup function controller 60 determines whether there are any combinations of the setting data (S102). When there is a combination, the flow moves to S105, and when there is no combination, the flow moves to S103.

For example, assume that the current setting data is the function 2, the output pixel number is 2M, the frame rate is 3 fps, and the user changes the frame rate (first item) to 12 fps (first setting data) among these three items. In this case, as illustrated in the circles in Table 2, there is a combination of the function 2, 2M and 12 fps. When there is a combination, the two remaining setting data are maintained and the flow moves to S105 so as to set the setting data. In other words, the image-pickup function controller 60 selects any combinations from the table that include the first setting data of the first item and current setting data of the two remaining items.

On the other hand, when there is no combinations, the image-pickup function controller 60 selects from the table the setting data most similar to the input values by putting priority on the setting data of the image-pickup function condition input by the user (S103).

For example, assume that the current setting data is the function 3, the output pixel number is 2M, the frame rate is 48 fps, and the user changes the output pixel number (first item) to 8M. In Table 2, as illustrated by an X, there is no combination of the function 3, 8M, and 48 fps.

A combination of the three items which satisfies the output pixel number of 8M includes a combination of the function 2, 8M, and 6 fps, a combination of the function 4, 8M, and 24 fps, a combination of the function 3, 8M, and 12 fps, etc. Since the setting data of a combination of the function 3, 8M, and 12 fps is most similar to the user setting of a combination of the function 3, 8M, and 48 fps in Table 2, the combination of the function 3, 8M, and 12 fps is automatically selected.

In other words, the image-pickup function controller 60 selects a combination that is most similar to the current setting data of the two remaining items and the first setting data of the first item when a combination of the first setting data of the first item and the current setting data of the two remaining items is unavailable.

The compound-eye function priority table is configured so as to put priority on the compound-eye function priority. When the most similar combination is searched, the second priority is put on the setting data of the compound-eye function in setting. In this case, the frame rate is reduced from 48 fps to 12 fps based on the current setting data.

Next, the image-pickup function controller 60 drives the display controller 90 and displays, on the display unit 300, a warning of a setting change representing that either or both other than the setting data input by the user is changed (S104). The display warning of the setting change may be replaced with a warning sound through a speaker.

Next, the image-pickup function controller 60 sets the setting data of the two image-pickup function conditions other than the setting data input by the user, drives the display controller 90, and displays the setting data on the display 300 (S105).

Figure 5:
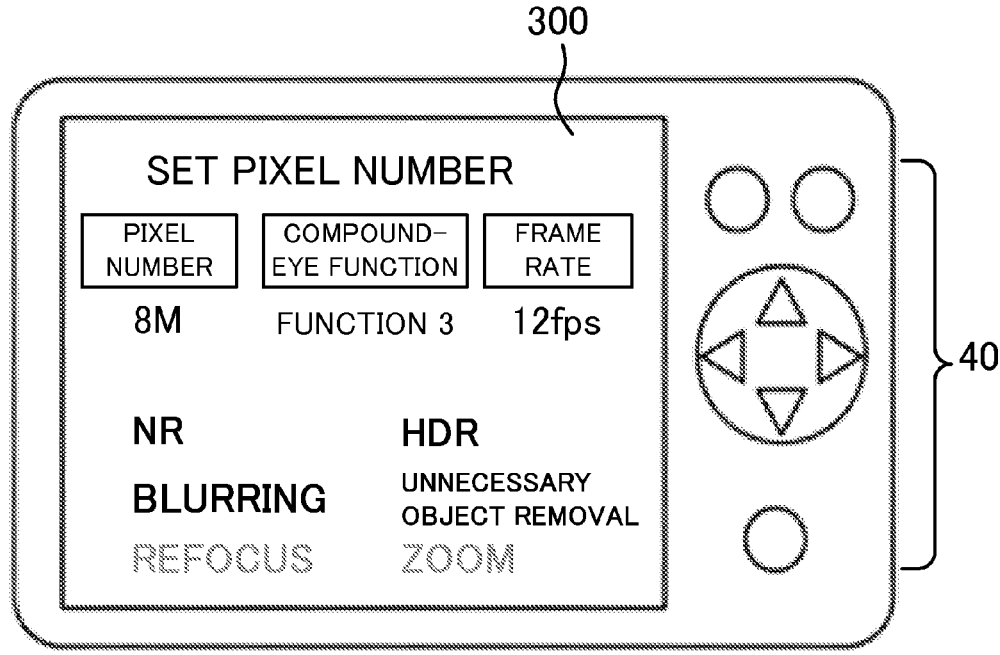
FIG. 5 is a rear view of the compound-eye image-pickup apparatus illustrated in FIG. 1.

FIG. 5 is a rear view of the compound-eye image-pickup apparatus 1, and the display unit 300 illustratively displays the setting data. The display unit 300 displays the setting data of the three image-pickup function conditions and the compound-eye function title. Thereby, the user can easily recognize which item in the compound-eye function can be realized with the current setting data. Herein, the available function item is displayed in black, and the unavailable function item is displayed in gray. Of course, the display method is not limited to this embodiment as long as the available compound-eye function item and the unavailable compound-eye function item can be differently displayed. The setting flow of the image-pickup function condition is thus completed.

Table 3 is an output pixel number priority table configured to store the combination information of the image-pickup function condition. Since the storing procedure of the combination information is similar to that for Table 2, a description thereof will be omitted.

TABLE 3

| Frame rate | Pixel number | | | | | | | | | | | |
|---|---|---|---|---|---|---|---|---|---|---|---|---|
| | 8M | | | | 4M | | | | 2M | | | |
| | compound-eye function | | | | | | | | | | | |
| | function | | | | function | | | | function | | | |
| | 1 | 2 | 3 | 4 | 1 | 2 | 3 | 4 | 1 | 2 | 3 | 4 |
| 3 fps | o | o | o | o | o | o | o | o | o | o | o | o |
| 6 fps | x | o | o | o | o | o | o | o | o | o | o | o |
| 12 fps | x | x | o | o | x | o | o | o | o | o | o | o |

TABLE 3-continued

| | Pixel number | | | | | | | | | | | |
|---|---|---|---|---|---|---|---|---|---|---|---|---|
| | 8M | | | | 4M | | | | 2M | | | |
| | compound-eye function | | | | | | | | | | | |
| Frame | function | | | | function | | | | function | | | |
| rate | 1 | 2 | 3 | 4 | 1 | 2 | 3 | 4 | 1 | 2 | 3 | 4 |
| 24 fps | x | x | x | o | x | x | o | o | x | o | o | o |
| 48 fps | x | x | x | x | x | x | x | o | x | x | o | o |
| 96 fps | x | x | x | x | x | x | x | x | x | x | x | o |

In the compound-eye image-pickup apparatus 1, the flow of the automatically determining method of the setting data of the image-pickup function condition based on the output pixel number priority table is similar to that of FIG. 4, and a detailed description of the setting data determining procedure will be given when there is no combination.

For example, assume that the current setting data is the function 2, the output pixel number is 4M, the frame rate is 12 fps, and the user attempts to change the frame rate to 48 fps. However, the combination of the function 2, 4M and 48 fps is unavailable as illustrated by X in Table 3.

The combination of the three elements which satisfies 48 fps includes a combination of the function 4, 4M, and 48 fps, a combination of the function 3, 2M, and 48 fps, and a combination of the function 4, 2M, and 48 fps, etc. The setting data of the combination of the function 4, 4M, and 48 fps is most similar to the user's setting of the function 2, 4M, and 48 fps and thus automatically selected.

Table 3 is configured so as to put priority on the output pixel number. When the most similar combination is searched, the second priority is put on the setting data of the output pixel number. In this case, the compound-eye function is changed from the function 2 to the function 4 based on the current setting data.

Table 4 is a frame rate priority table configured to store the combination information of the image-pickup function condition. Since the storing procedure of the combination information is similar to that for the Table 2, a description thereof will be omitted.

compound-eye function to the function 1. However, the combination of the function 1, 4M and 12 fps is unavailable as illustrated by X in Table 4.

The combination of the three elements which satisfies the function 1 includes a combination of the function 1, 2M, and 12 fps, a combination of the function 1, 4M, and 6 fps, a combination of the function 1, 4M, and 3 fps, etc. The setting data of the combination of the function 1, 2M, and 12 fps is most similar to the user's setting of the function 1, 4M, and 12 fps and thus automatically selected.

The arrangement of Table 4 has preference to the frame rate. When the most similar combination is searched, the second priority is put on the setting data of the frame rate. In this case, the output pixel number is changed from 4M to 2M.

Second Embodiment

Figure 6:
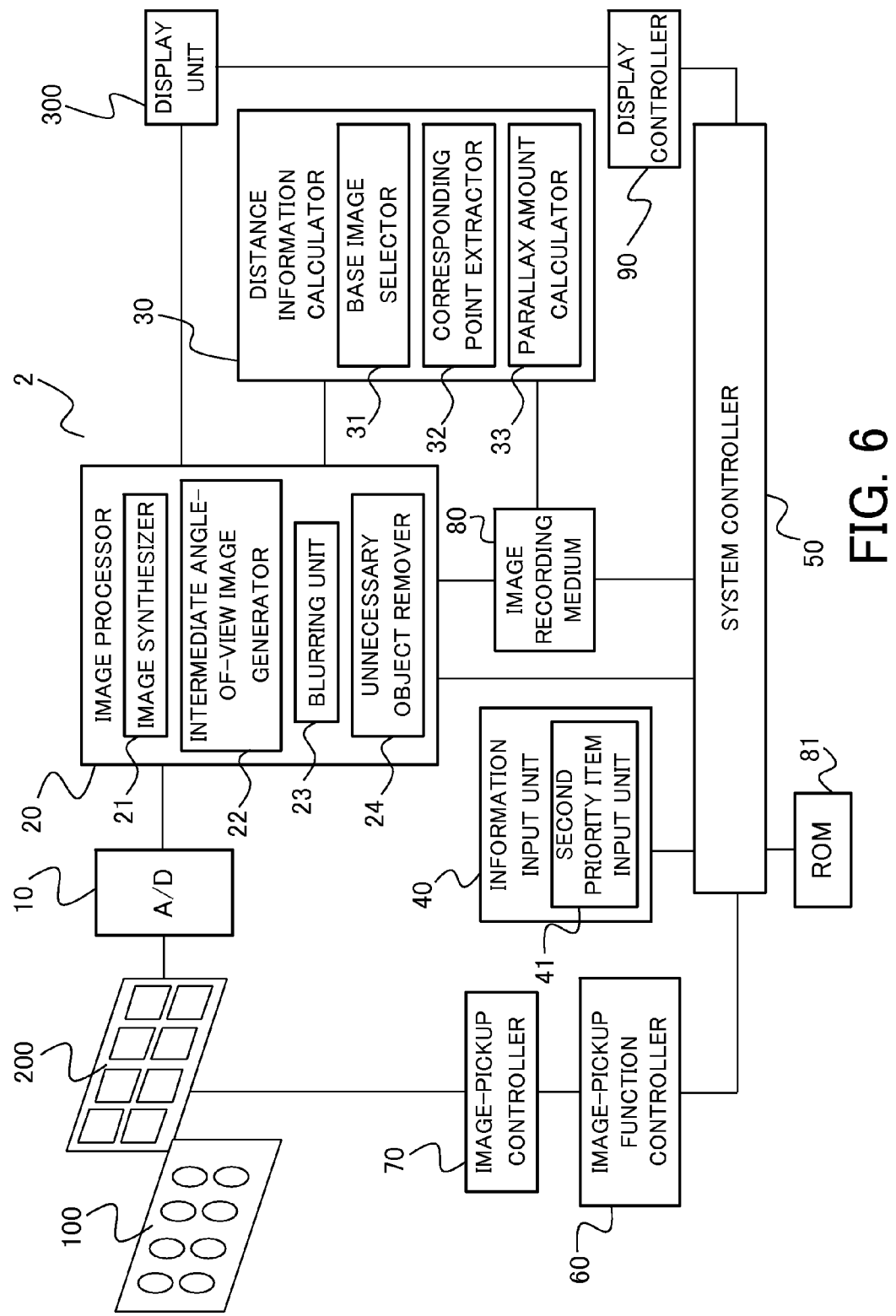
FIG. 6 is a block diagram of a compound-eye image-pickup apparatus according to a second embodiment of the present invention.

FIG. 6 is a block diagram of a compound-eye image-pickup apparatus 2 according to a second embodiment, and those elements in FIG. 6 which are the corresponding elements of FIG. 1 will be designated by the same reference numerals.

The information input unit 40 further includes a second priority item input unit 41. The second priority item input unit 41 obtains input information of the second setting data of the second priority image-pickup function condition (second item) different from the first setting data which the

TABLE 4

| | Frame rate | | | | | | | | | | | | | | | | | |
|---|---|---|---|---|---|---|---|---|---|---|---|---|---|---|---|---|---|---|
| | 96 fps | | | 48 fps | | | 24 fps | | | 12 fps | | | 6 fps | | | 3 fps | | |
| compound- | Output pixel number | | | | | | | | | | | | | | | | | |
| eye function | 8M | 4M | 2M | 8M | 4M | 2M | 8M | 4M | 2M | 8M | 4M | 2M | 8M | 4M | 2M | 8M | 4M | 2M |
| function 4 | x | x | o | x | o | o | o | o | o | o | o | o | o | o | o | o | o | o |
| function 3 | x | x | x | x | x | o | x | o | o | o | o | o | o | o | o | o | o | o |
| function 2 | x | x | x | x | x | x | x | x | o | x | o | o | o | o | o | o | o | o |
| function 1 | x | x | x | x | x | x | x | x | x | x | x | o | x | o | o | o | o | o |

In the compound-eye image-pickup apparatus 1, the flow of the automatically setting method of the setting data of the image-pickup function based on the frame rate priority table is similar to that of FIG. 4, and a detailed description of the setting data determining procedure will be given when there is no combination.

For example, assume that the current setting data has the function 2, the output pixel number of 4M, the frame rate of 12 fps, and the user makes an input so as to change the user sets for the first priority image-pickup function condition (first item). The input information is supplied to the system controller 50.

The ROM 81 stores a variety of programs executed by the system controller 50 and data necessary for the programs. The ROM 81 also stores three types of tables illustrated in the first embodiment in which the combination information of the output pixel number, the frame rate, and the compound-eye function is recorded.

Figure 7:
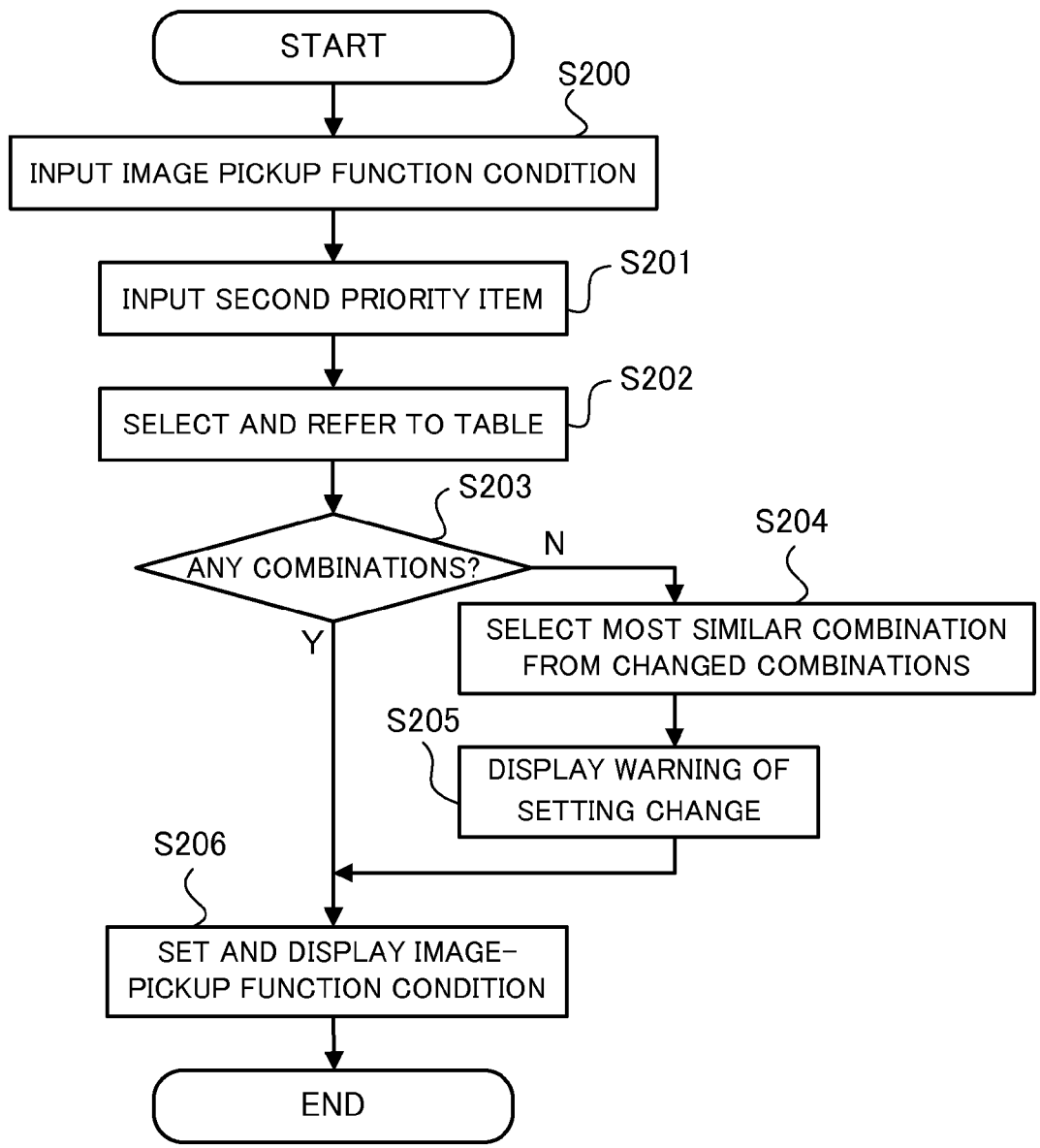
FIG. 7 is a flowchart for explaining an image-pickup (function) condition setting method according to the second embodiment.

Next follows an automatic determining method of the setting data of the image-pickup function condition executed in the compound-eye image-pickup apparatus 2 based on the three types of tables. FIG. 7 is a flowchart for explaining the method of setting the image-pickup function condition in the compound-eye image-pickup apparatus 2, and "S" stands for the step. The method illustrated in FIG. 7 can also be implemented as a program that enables the computer to execute each procedure. The program may be stored in a non-transitory computer-readable medium.

Initially, when the user inputs first setting data to change one (first item) of the three image-pickup function conditions, the image-pickup function controller 60 obtains the current setting data of the two remaining image-pickup conditions (S200).

Next, the user inputs, through the second priority item input unit 41, second setting data of the second priority item (second item) among the two remaining image-pickup function condition (S201).

Next, the image-pickup function controller 60 selects and refers to one of the three types of tables based on the second priority function information input in S201. Herein, whether there are any combinations of the setting data of the three image-pickup function conditions (S202).

For example, assume that the user inputs setting data of the output pixel number in S200, and selects the compound-eye function (two eyes or more) as the second priority item (or second item) in S201. Then, the compound-eye function priority table illustrated in Table 2 is selected and referred to.

Next, the image-pickup function controller 60 checks for any combinations of the setting data (S203). When the combination exists, the flow moves to S206 along "YES." In other words, the image-pickup function controller 60 sets setting data of a third item except the first and second items among the three items based on the combination of the three items in which the first item has the first setting data and the second item has the second setting data in Table 2. In this case, the image-pickup function controller 60 selects any combinations from Table 2, which include the first setting data of the first item, the second setting data of the second item, and the current setting data of the third item.

On the other hand, when no combination exist, the flow moves to S204 along "NO." In S204, the image-pickup function controller 60 selects the combination most similar to the input value by putting priority on the setting data of one image-pickup function condition input by the user.

For example, assume that the current setting data has the function 3, the output pixel number of 2M, the frame rate of 48 fps, and the user makes an input so as to change the output pixel number (first item) to 8M (first setting data). The combination of the function 3, 8M and 48 fps is unavailable as illustrated by X in Table 2. In other words, the combination of the first setting data of the first item, the second setting data of the second item, and the current setting data of the third item is unavailable in Table 2.

The combination of the three elements which satisfies the output pixel number 8M includes a combination of the function 2, 8M, and 6 fps, a combination of the function 4, 8M, and 24 fps, a combination of the function 3, 8M, and 12 fps, etc. The setting data of a combination of the function 3, 8M, and 12 fps is most similar to the user's setting of the function 3, 8M, and 48 fps and thus automatically selected. In other words, the image-pickup function controller 60 selects the combination that is most similar to the combination of the output pixel number 8M, the function other than the function 4 (second setting data) and the current setting data (48 fps) of the frame rate (third item).

This illustrative compound-eye priority table is configured so as to put priority on the compound-eye function, and thus second priority is put on the setting data of the compound-eye function when the most similar combination is searched. In this case, the frame rate of 48 fps is reduced to 12 fps from the current setting data.

Next, the image-pickup function controller 60 drives the display controller 90 so as to display on the display unit 300 a warning that one or both items other than setting data input by the user are reduced (S205).

Next, the image-pickup function controller 60 sets two pieces of image-pickup function condition setting data other than the setting data input by the user, drives the display controller 90, and displays the setting data on the display unit 300 (S206). The setting flow of the image-pickup function condition is thus completed. The second priority item selector thus facilitates the setting of the image-pickup function condition that reflects the user's image-pickup intent.

As discussed above, each of the three types of tables puts first priority on one of the column and the row, and second priority on the other of the column and the row, and assigns the available setting data of the remaining third item to each available setting data of the second priority item.

The image-pickup function controller 60 selects one combination based on the first priority item and the second priority item. The image-pickup function controller 60 selects the available combination in the selected table by changing the setting data of the third item while the first setting data of the first priority item and the second setting data of the second priority data are maintained.

In general, when an input is made to make the second item have the second setting data, the setting data of the remaining item other than the first item and the second item is set based on a plurality of combinations in which the first item has the first setting data and the second item has the second setting data.

Each of the first and second embodiments enables the image-pickup apparatus, such as a video camera and a digital camera, to appropriately set a combination of the available function with at least one of the plurality of imaging optical systems, the output pixel number, and the frame rate.

While the first and second embodiments describes three tables, the present invention is not limited to these embodiments. While the first and second embodiments refer to the table in determining the setting data, the present invention may determine the appropriate setting data through a calculation based on the above condition and setting data of the three current image-pickup function conditions.

The present invention can provide an image-pickup apparatus, a control method, and a non-transitory computer-readable medium, which can automatically and properly set a combination of an available function with at least one of a plurality of imaging optical systems, an output pixel number, and a frame rate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No 2013-254885, filed Dec. 10, 2013, which is hereby incorporated by reference herein in its entirety.

What is claimed is:

1. An image-pickup apparatus comprising:
a plurality of imaging optical systems each configured to form an optical image of an object;
an image sensor having image-pickup areas each corresponding to one of the plurality of imaging optical systems and each configured to photoelectrically convert the optical image formed by a corresponding one of the imaging optical systems;
a memory configured to store a relationship among an output pixel number, a frame rate, and a compound-eye function that is available with at least two of the imaging optical-systems; and
a controller configured to set, when first setting data is input as setting data of a first item among a plurality of items including the output pixel number, the frame rate, and the compound-eye function, setting data of remaining items except the first item in the plurality of items based on any combinations of the plurality of items in which the first item has the first setting data in the relationship stored in the memory.

2. The image-pickup apparatus according to claim 1, wherein the controller selects a combination in the relationship, in which the first item has the first setting data and the remaining items have current setting data.

3. The image-pickup apparatus according to claim 1, wherein the controller sets a priority for the remaining items, and selects, when there is no combination in the relationship, in which the first item has the first setting data and the remaining items have current setting data, a combination in which the first item has the first setting data, one of the remaining items selected based on the set priority has the current setting data, and the other of the remaining items does not have the current setting data as a combination which is most similar to the combination in which the first item has the first setting data and the remaining items have the current setting data.

4. The image-pickup apparatus according to claim 3, wherein the controller provides a warning of a setting change when the controller selects the combination that is most similar to the combination in which the first item has the first setting data and the remaining items have current setting data.

5. The image-pickup apparatus according to claim 1, wherein the plurality of imaging optical systems include a plurality of imaging optical systems having different angles of field,
wherein the compound-eye function includes a first function item, and a second function item that is available with the imaging optical systems, the number of imaging optical systems being smaller than that for the first function item; and
wherein the first function item includes a change of an angle of view, and the second function item does not include the change of the angle of view.

6. The image-pickup apparatus according to claim 1, wherein the controller sets, when an input is made so as to make a second item in the remaining items have second setting data, setting data of remaining items except the first item and the second item based on any combinations of the plurality of items in the relationship, in which the first item has the first setting data and the second item has the second setting data.

7. The image-pickup apparatus according to claim 6, wherein the controller selects a combination in the relationship, in which the first item has the first setting data, the second item has the second setting data, and the remaining items have current setting data.

8. The image-pickup apparatus according to claim 6, wherein the controller selects, when there is no combination in the relationship, in which the first item has the first setting data, the second item has the second setting data, and the remaining items have current setting data, a combination that is most similar to the combination in which the first item has the first setting data, the second item has the second setting data, and the remaining items have the current setting data.

9. The image-pickup apparatus according to claim 8, wherein the controller provides a warning of a setting change when the controller selects the combination that is most similar to the combination in which the first item has the first setting data, the second item has the second setting data, and the remaining items have current setting data.

10. The image-pickup apparatus according to claim 8, wherein the plurality of items include first, second, and third items, and the relationship is expressed by three types of tables,
wherein the controller selects one of the three types of tables, which has the first item at one of a column and a row, the second item at the other of the column and the row, and assigns any available setting data of the third item to any available setting data of the second item, and
wherein the controller selects any combinations of the first item, the second item, and the third item in the table selected from the three types of tables, in which the first item has the first setting data, the second item has the second setting data by changing setting data of the third item.

11. The image-pickup apparatus according to claim 1, further comprising a display unit configured to display an available function item and an unavailable function item by different display methods.

12. The image-pickup apparatus according to claim 1, wherein the function includes at least one of a noise reduction, a formation of a high dynamic range image, blurring, an unnecessary object removal, refocusing, and zooming by synthesizing a plurality of images having different angles of view.

13. A control method for an image-pickup apparatus that includes a plurality of imaging optical systems each configured to form an optical image of an object, an image sensor having image-pickup areas each corresponding to one of the plurality of imaging optical systems and each configured to photoelectrically convert the optical image formed by a corresponding one of the imaging optical systems, and a controller configured to execute the control method, the control method comprising the steps of:
determining, when first setting data is input as setting data of a first item among a plurality of items including an output pixel number, a frame rate, and a compound-eye function that is available with at least two of the imaging optical-systems, whether there is a first combination in which the first item has the first setting data and remaining items except the first item in the plurality of items have current setting data in a relationship among the plurality of items;
setting a priority for the remaining items; and
setting the first combination when the first combination exists in the relationship, and a second combination in which the first item has the first setting data, one of the remaining items selected based on the priority has the current setting data, and the other of the remaining items does not have the current setting data, as a combination that is most similar to the first combination in the relationship when the first combination does not exist in the relationship.

14. The control method according to claim 13, further comprising the step of setting, when an input is made so as to make a second item in the remaining items have second setting data, setting data of remaining items except the first item and the second item based on any combinations of the plurality of items in the relationship, in which the first item has the first setting data and the second item has the second setting data.

15. The control method according to claim 14, further comprising the step of selecting a combination in the relationship, in which the first item has the first setting data, the second item has the second setting data, and the remaining items have current setting data.

16. The control method according to claim 14, further comprising the step of selecting, when there is no combination in the relationship, in which the first item has the first setting data, the second item has the second setting data, and the remaining items have current setting data, a combination that is most similar to the combination in which the first item has the first setting data, the second item has the second setting data, and the remaining items have the current setting data.

17. The control method according to claim 16, further comprising the step of providing a warning of a setting change when the combination is selected which is most similar to the combination in which the first item has the first setting data, the second item has the second setting data, and the remaining items have current setting data.

18. The control method according to claim 13, further comprising the step of providing a warning of a setting change when the combination is selected which is most similar to the combination in which the first item has the first setting data and the remaining items have current setting data.

19. A non-transitory computer-readable medium configured to enable a computer to execute a control method for an image-pickup apparatus that includes a plurality of imaging optical systems each configured to form an optical image of an object, an image sensor having image-pickup areas each corresponding to one of the plurality of imaging optical systems and each configured to photoelectrically convert the optical image formed by a corresponding one of the imaging optical systems, and a controller configured to execute the control method, the control method comprising the steps of:

determining, when first setting data is input as setting data of a first item among a plurality of items including an output pixel number, a frame rate, and a compound-eye function that is available with at least two of the imaging optical-systems, whether there is a first combination in which the first item has the first setting data and remaining items except the first item in the plurality of items have current setting data in a relationship among the plurality of items;

setting a priority for the remaining items; and setting the first combination when the first combination exists in the relationship, and a second combination in which the first item has the first setting data, one of the remaining items selected based on the priority has the current setting data, and the other of the remaining items does not have the current setting data, as a combination that is most similar to the first combination in the relationship when the first combination does not exist in the relationship.

* * * * *